Sept. 22, 1970    J. F. WEHDE    3,529,735
BALE LIFTING APPARATUS
Filed Aug. 26, 1968
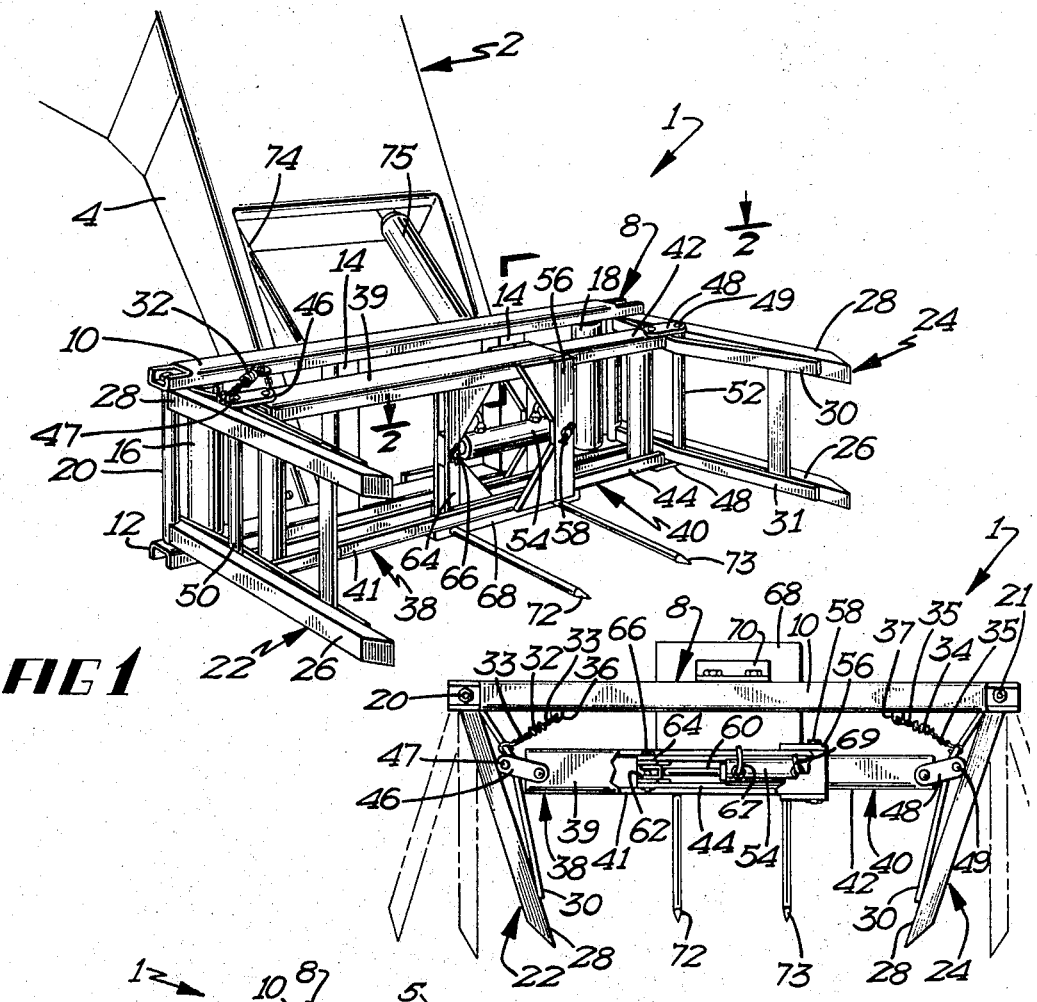
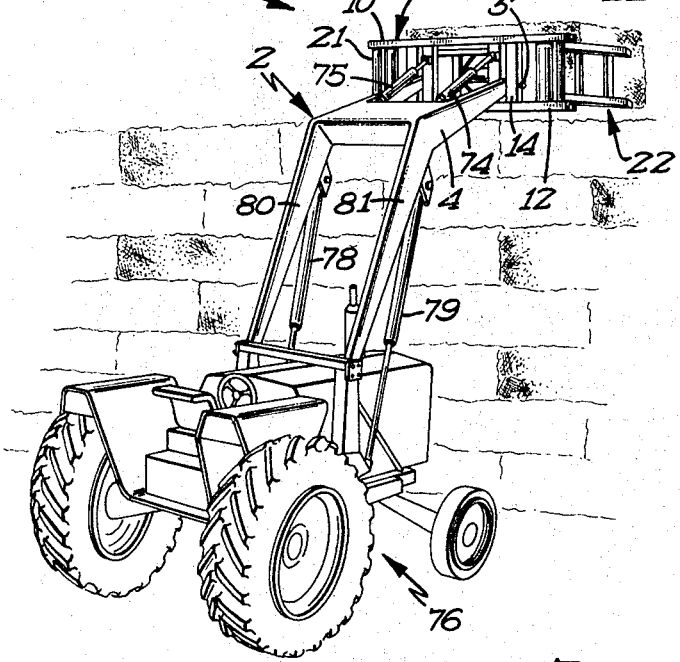
INVENTOR.
JAMES F. WEHDE
BY
Williamson, Palmatier
& Bains
ATTORNEYS United States Patent Office 3,529,735
Patented Sept. 22, 1970

3,529,735
BALE LIFTING APPARATUS
James F. Wehde, Garretson, S. Dak. 57030
Continuation-in-part of application Ser. No. 572,391,
Aug. 15, 1966. This application Aug. 26, 1968,
Ser. No. 755,071
Int. Cl. B66c 1/58
U.S. Cl. 214—147                                                5 Claims

ABSTRACT OF THE DISCLOSURE

Apparatus for lifting and stacking hay bales comprising a main frame and a pair of spaced apart, bale engaging clamps projecting forwardly therefrom and pivotally attached thereto for swinging movement about vertical axes; telescoping frame assemblies pivotally connected to said clamps swing them towards and away from each other. A hydraulic cylinder and piston unit serves to move the telescoping frame assemblies towards and away from each other so as to actuate said bale clamps between open and bale engaging positions. The aforesaid main frame is secured to the lift forks of a hydraulically-powered end loader boom of a vehicle, such as a farm tractor.

---

This application is a continuation-in-part of my co-pending application entitled "Bale Accumulator," Ser. No. 572,391, filed Aug. 15, 1966, now Pat. No. 3,402,832.

The process of harvesting hay conventionally encompasses the steps of cutting the hay, forming it into bales, accumulating the bales in stacks, and loading the accumulated bales onto a truck or wagon for transportation to a stack yard or feed area. Baling machines of various types are well known, and my above-noted co-pending application, Ser. No. 572,391, now Pat. No. 3,402,832 describes a novel bale accumulator which is adapted to be towed behind a baling machine and which operates automatically to accumulate a predetermined number of bales in a stacked group and to unload the bale group onto the ground. The stacked bales must then be picked up in some manner, loaded onto a truck or wagon and transported to a storage or feed area. The manual loading of the hay bales onto a truck or wagon and the subsequent unloading of the bales in a storage area is a laborious and time-consuming task. To the best of my knowledge, there is no known power-operated bale handling apparatus by means of which the bales may be easily lifted off the ground onto a truck or wagon bed and subsequently unloaded therefrom in neat stacks.

The bale lifter of this invention has been particularly designed to satisfy the need for such a bale handling apparatus, and is intended to be used in conjunction with a bale accumulator as disclosed in my aforesaid co-pending application to provide a completely mechanized bale accumulating, loading and stacking system.

My improved bale lifter and stacker is adapted to be readily attached to the lift boom of an end loader mounted on a vehicle, and is particularly characterized by two, bale-engaging clamps which are pivotally mounted on a support frame for swinging movement about vertical axes. The lifter frame is constructed and arranged for convenient attachment to the lift arms or forks of a loader boom.

A particularly advantageous feature of my bale lifting apparatus resides in the utilization of telescoping frame assemblies, extending generally parallel to the lifter main frame, to alternately swing the aforesaid bale clamps towards and away from each other for the purpose of grasping and releasing a bundle of hay bales.

As a further advantageous feature of my invention, I employ a double-acting hydraulic cylinder connected to one end of the aforesaid telescoping frame assemblies to telescope the frame assemblies together and slidably extend them apart for the purpose of actuating the bale clamps between their open and closed, bale engaging positions.

The bale lifting operation is further facilitated by the incorporation on my lift apparatus of two forwardly-projecting tines which assist in supporting and restraining a plurality of hay bales as they are being lifted and stacked.

These and other objects and advantages of my invention will become readily apparent as the following description is read in conjunction with the accompanying drawings wherein like reference numerals have been used to designate like elements throughout the several views, and wherein:

FIG. 1 is a front, perspective view of my improved bale lifting and stacking apparatus;

FIG. 2 is a top, plan view of the bale lifting apparatus of FIG. 1;

FIG. 3 is a perspective view showing my unique bale lifting and stacking unit attached to a front end loader mounted on a farm tractor.

The bale lifting apparatus of this invention is indicated generally by reference numeral 1 in FIG. 1, and is shown attached to the forwardly projecting arms 4 and 6 of a lift boom 2 of a vehicle-mounted end loader. Lift apparatus 1 has a main frame 8 comprised of upper and lower, generally horizontally extending channel beams 10 and 12 and upright braces 14 extending therebetween. End posts 16 and 18 also serve to rigidize and strengthen frame structure 8. Disposed between channel beams 10 and 12 at the opposite ends thereof are upright pivot shafts 20 and 21 which are rotatably supported at their upper and lower ends on beams 10 and 12.

Attached to upright pivot shafts 20 and 21 are a pair of forwardly projecting, bale-engaging clamps generally indicated by reference numerals 22 and 24. Upper and lower channel iron arms 28 and 26 of clamps 22 and 24 are secured at their inner ends to pivot shafts 20 and 21, as by welding, for rotation therewith. Bracing and pull strips 30 and 31 for clamps 22 and 24 extend along clamp arms 28 and 26 and are secured thereto at their opposite ends. As may best be understood by reference to FIG. 2, coil springs 32 and 34 are hooked between stablizer chain sections 33 and 35 connected between upper bracing strips 30 and clevis members 36 and 37 welded to upper brace 10 of main frame 8. Springs 32 and 34 are connected between chain sections 33 and 35 in such a way as to hold bale clamps 22 and 24 in the center, phantom line position shown in FIG. 2 wherein clamps 22 and 24 extend substantially at right angles to main frame 8.

For the purpose of opening and closing bale clamps 22 and 24 so that they may alternately grip and release stacks of hay bales, I provide clamp actuators in the form of telescoping units 38 and 40. Each of the units 38 and 40 is comprised of a frame assembly made up of channel iron sections. Upper and lower channel sections 39 and 41 of frame assembly 38 are sized to slidably receive complementary channel iron sections 42 and 44 of frame assembly 40 in telescoping relation therewith. Telescoping frame assemblies 38 and 40 are connected at their outer ends to bale clamps 22 and 24 by means of links 46 and 48 pivotally attached at points 47 and 49 to the upper and lower ends of upright shafts 50 and 52. Vertical members 50 and 52 are integral parts of bale clamps 22 and 24 to which they are secured between brace strips 30, 31 and clamp arms 28, 26.

Controlled movement is imparted to telescoping actuator assemblies 38 and 40 by means of a double-acting hydraulic cylinder 54 disposed between bale clamps 22 and 24. Cylinder 54 is secured at its base end to upright, reinforcing members 56 at the inner end of frame assembly 38 by means of connecting pin 58. Piston 60, most clearly shown in FIG. 2, is slidably supported within cylinder 54 for reciprocating movement therein and extends through one end thereof to a point of connection with the inner end of telescoping frame assembly 40. Bifurcated end 62 of piston 60 is attached to upright, reinforcing members 64 of frame assembly 40 by connecting pin 66.

Hydraulic fluid is supplied to cylinder 54 by means of hoses 67 and 69 extending from the opposite ends thereof to points of connection with the hydraulic power system of a vehicle, such as tractor 76 shown in FIG. 3.

Referring again to FIGS. 1 and 2, it will be seen that I have provided a skid plate 68 on the underside of main frame 8 in order to permit the lift apparatus to slide smoothly along the ground as it is being moved into position to clamp and lift a bundle of hay bales. Skid plate 68 is bolted to bottom channel beam 12 of main frame 8 by bracket 70, and also supports a pair of forwardly projecting tines 72 and 73. Tines 72 and 73 assits in restraining and supporting hay bales as they are being lifted by clamps 22 and 24.

My improved bale clamping and lifting apparatus as above described is adapted to be readily attached to an end loader of a vehicle. For purposes of illustration, I have shown in FIG. 3 a tractor 76 having a front-end loader on which my bale lifting apparatus has been mounted. Hydraulic lift cylinders 78 and 79 are connected to side frame members 80 and 81 of loader boom 2, and serve to raise and lower the boom assembly in the conventional manner. Main frame 8 of my bale clamping and lifting apparatus is pivotally connected to the forward end of loader arms 4 and 6 by means of pins 5 extending through upright braces 14 in the manner indicated in FIG. 2. The entire bale clamp assembly 1 may be pivoted about the horizontal axis defined by pivot pin 5 by means of supplemental hydraulic cylinders 74 and 75 mounted on loader boom 2. Such pivotal movement of bale clamp assembly 1 is, of course, necessary in order to orient it to a horizontal position for picking up or discharging a stack of hay bales.

In operation, bale lift assembly 1 may be used as a front-end loader attachment in the manner shown in FIGS. 1 and 3 to pick up stacks of hay bales which have been dropped in the field in neat stacks by the bale accumulator disclosed in my aforesaid copending application, Ser. No. 572,391. Although my unique bale lifter may be constructed and arranged to pick up various sizes and quantities of hay bales, clamps 22 and 24 have been spaced wide enough apart to grip five ordinary size bales therebetween, stacked two deep in a bundle of ten by my bale accumulator. In picking up a stack of hay bales, end loader boom 2 will first be lowered to the ground by hydraulic cylinders 78 and 79, and then lift apparatus 1 will be pivoted to a generally horizontal position on the ground by hydraulic cylinders 74 and 75. Hydraulic cylinder 54 must then be actuated by control means on tractor 76 (not shown) to open bale clamps 22 and 24 to the outwardly angled phantom line position shown in FIG. 2. In order to swing bale clamps 22 and 26 outwardly to their fully open position shown in FIG. 1, hydraulic fluid is applied through hose 67 to the forward end of piston 60; this causes piston 60 to be retracted within hydraulic cylinder 54 to the position shown in FIG. 1. The application of hydraulic pressure between the forward end of cylinder 54 and piston 60 causes cylinder 54 to move to the left (as viewed from the front in FIGS. 1 and 2) at the same time that piston 60 reciprocates into cylinder 54 and moves to the right. This movement of cylinder 54 and piston 60 forces telescoping frame assemblies 38 and 40 apart with frame assembly 40 sliding out of assembly 38 to the extended position shown in FIG. 1. As frame assemblies 38 and 40 move apart, they will swing bale clamps 22 and 24 outwardly to their open positions. Tractor 76 may then be moved forwardly in order that bale clamps 22 and 24 may embrace the stack of hay bales to be lifted. The forward movement of tractor 76 will cause tines 72 and 73 to slide under the stack of hay bales. Hydraulic fluid is then applied through hose 69 to the base end of cylinder 54 to extend reciprocating piston 60. As piston 60 reciprocates out of piston 54, the counter pressure on the base of cylinder 54 will move cylinder 54 to the right with the result that frame assemblies 38 and 40 will be pulled towards each other and will telescope together in the manner indicated in FIG. 2. As actuator assemblies 38 and 40 telescope together they will pull bale clamps 22 and 24 with them, thereby pivoting clamps 22 and 24 inwardly to the solid line position shown in FIG. 2 in engagement with a stack of hay bales. The stack of hay bales will now be firmly grasped between side clamps 22 and 24 and supported by tines 72 and 73. Hydraulic cylinders 78 and 79 may then be actuated to lift loader boom 2 to place the stack of hay bales on a truck or wagon for transportation to a feed area or stack yard. The bales may be unloaded on the bed of the truck or wagon by simply using hydraulic cylinder 54 to pivot bale clamps 22 and 24 to their outwardly angled, fully open position, whereby the bundle of hay bales will be released. The same process of picking up, lifting and releasing stacks of hay bales may be repeated at the stack yard to unload the hay from the transport truck or wagon.

Those skilled in the art will readily appreciate that my unique bale lifting apparatus may be effectively and efficiently utilized to greatly reduce the time and effort formerly expended in moving hay bales from the field into a stack or barn. The hydraulically powered bale lifter of this invention grips stacks of hay bales in firm, tight packages so as to insure safe lifting and the building of solid truckloads in neat, long-lasting stacks.

It is to be noted that hydraulic cylinder 54 and piston 60 are so connected to the inner ends of telescoping frame assemblies 38 and 40 that the maximum hydraulic pressure required for pulling bale clamps 22 and 24 inwardly and compressing a load of hay bales is applied to the base end of cylinder 54 through hydraulic hose 69 to extend piston 60 on its power stroke. The hydraulic pressure applied through hose 67 to open bale clamps 22 and 24 is considerably less, and thus the danger of developing a hydraulic fluid leak at the sliding seal between piston 60 and the forward end of hydraulic cylinder 54 is greatly minimized.

I contemplate that various changes may be made in the size, shape, and arrangement of the various parts of my improved bale lifting apparatus without departing from the spirit and scope of my invention.

What is claimed is:

1. Bale lifting apparatus for lifting and moving a plurality of hay bales comprising:

a main frame adapted to be attached to an end loader of a vehicle;

first and second bale-engaging clamps pivotally mounted on said frame on vertical axes and projecting forwardly from opposite ends thereof;

first and second clamp actuators attached at their outer ends to said first and second clamps respectively, extending inwardly therefrom and movable therewith, said actuators comprising a pair of elongated, rigid units arranged in telescoping relation to each other;

and a fluid motor comprising a hydraulic cylinder having a piston reciprocally supported therein and slidably extending through one end thereof, said piston being connected to an inner end portion of one of said rigid actuator units and said hydraulic cylinder being connected to an inner end portion of the other one of said rigid actuator units.

2. Bale lifting apparatus as defined in claim 1 wherein:
said clamp actuators comprise first and second frame assemblies extending generally parallel to said main frame, and connected at their outer ends to said clamps; and
said piston is connected to the inner end of one of said frame assemblies and said hydraulic cylinder is connected to the inner end of the other one of said frame assemblies.

3. Bale lifting apparatus as defined in claim 1 wherein:
said hydraulic cylinder has first and second hydraulic connections at opposite ends thereof adapted to be connected to the hydraulic power system of said vehicle, the application of hydraulic pressure to the base of said piston remote from said one end of said cylinder serving to extend said piston and pull said telescoping frame assemblies together to pivot said clamp members inwardly in engagement with a load of hay bales.

4. Bale lifting apparatus as defined in claim 1, and further including:
a plurality of fork tines extending forwardly from said main frame generally parallel to said bale clamps, and positioned therebetween.

5. In combination with a vehicle having a hydraulically operated loader boom at one end thereof, a bale lifting mechanism comprising:
a main frame mounted on the forward end of said loader boom;
first and second bale engaging clamps extending forwardly from the opposite ends of said main frame and pivotally attached thereto for swinging movement about vertical axes;
first and second clamp actuators connected at their outer ends to said first and second clamps, respectively, and disposed therebetween, said clamp actuators comprising a pair of elongated, rigid, telescoping units slidable with respect to each other;
a double acting hydraulic cylinder having a reciprocating piston mounted therein and connected to the hydraulic power system of said vehicle, said piston being connected to an inner end portion of one of said clamp actuator units and said hydraulic cylinder being connected to an inner end portion of the other one of said clamp actuator units whereby the application of hydraulic pressure alternately to opposite ends of said piston serves to reciprocate said piston and said cylinder with respect to each other so as to cause said actuators to alternately telescope together and extend apart to thereby pull said bale engaging clamps together and spread them apart to pick up and release a stack of hay bales.

References Cited

UNITED STATES PATENTS

| 1,884,861 | 10/1932 | Remde | 214—147 |
| 3,010,590 | 11/1961 | Troth | 214—147 |
| 3,241,687 | 3/1966 | Orloff | 214—1 |
| 3,410,431 | 11/1968 | Vik | 294—88 X |

FOREIGN PATENTS

| 903,306 | 8/1962 | Great Britain. |
| 189,086 | 4/1964 | Sweden. |

GERALD M. FORLENZA, Primary Examiner

G. F. ABRAHAM, Assistant Examiner

U.S. Cl. X.R.

294—88, 108